Figure 1:
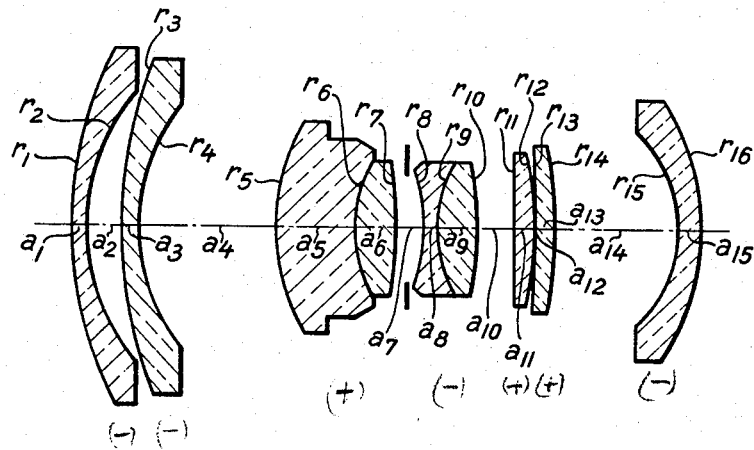

May 5, 1964     O. ZIMMERMANN ET AL     3,132,199
WIDE-ANGLE LENS

Filed April 11, 1961     2 Sheets-Sheet 1

INVENTORS
Otto Zimmermann, Heinz Marquardt,
Hermann Desch, Eugen Hermanni
BY

AGENT

INVENTORS
Otto Zimmermann, Heinz Marquardt,
Hermann Desch, Eugen Hermanni
BY
Erich M. H. Radde

AGENT

United States Patent Office 3,132,199
Patented May 5, 1964

3,132,199
WIDE-ANGLE LENS
Otto Zimmermann and Heinz Marquardt, Wetzlar (Lahn), Hermann Desch, Niederquembach, and Eugen Hermanni, Katzenfurt, Germany, assignors to Ernst Leitz G.m.b.H. Optische Werke, Wetzlar (Lahn), Germany, a company of Germany
Filed Apr. 11, 1961, Ser. No. 102,166
Claims priority, application Germany Apr. 16, 1960
10 Claims. (Cl. 88—57)

The present invention relates to wide-angle lenses.
Known camera objectives of this type comprise, between the object and the aperture, a meniscus lens means which may have one or more meniscus lenses of negative refractive power and concave in the direction of the aperture, and a positive lens means between the meniscus lens means and the aperture, while a lens arrangement consisting of at least two lenses is arranged between the aperture and the image-receiving plane, a meniscus lens having a concave surface of negative refractive power in the direction of the aperture being arranged between the image-receiving plane and the lens arrangement.

A common characteristic of all known wide-angle lenses of this type is the fact that the positive lens means and the lens arrangement on respective sides of the aperture have positive refractive power. For a relative aperture of 1:4.0, objectives of this type may be readily corrected. Rather unsatisfactory means for correcting such objectives with a relative aperture of 1:3.4 has also been proposed. Recent tests have shown, however, that these lenses are not useful for larger relative apertures, such as a relative aperture of 1:2.8, with economically feasible means.

In accordance with the present invention, the relative aperture of wide-angle lenses may be considerably increased while simultaneously improving their correction by placing a lens arrangement between the aperture and the afore-mentioned meniscus lens, which consists of a negative lens adjacent the aperture and a lens group having at least one positive lens between the negative lens and the meniscus lens. The negative lens is a meniscus lens having a concave surface facing the aperture, the radius of curvature of this concave surface being smaller than the focal length of the objective, preferably smaller than 90% of the focal length.

The negative lens may be a cemented meniscus according to one embodiment of this invention. According to another embodiment, it may consist of a positive meniscus and a separate negative meniscus.

In accordance with a preferred feature, the axial thickness of the negative lens is more than 10% but less than 30% of the focal length.

The negative lens as well as the positive lens group may have cemented surfaces for correcting chromatic and spherical aberrations.

It is a further feature of the invention to make the aperture space, i.e., the axial distance between the lenses on respective sides of the aperture, larger than 9% of the focal length, which exerts a favorable influence on the vignetting of the incident light.

To produce a distortion-free and anastigmatic lens according to the present invention, it is preferred to make the axial distances between the first meniscus lens means and the positive lens means, on the one hand, and between the lens arrangement and the meniscus lens nearest the image-receiving plane, on the other hand, between 30% and 70% of the focal length of the lens. The anastigmatic condition of the lens and the light ray distribution in the aperture space will be improved if the axial thickness of the positive lens means is between 35% and 50% of the focal length.

Figure 2:
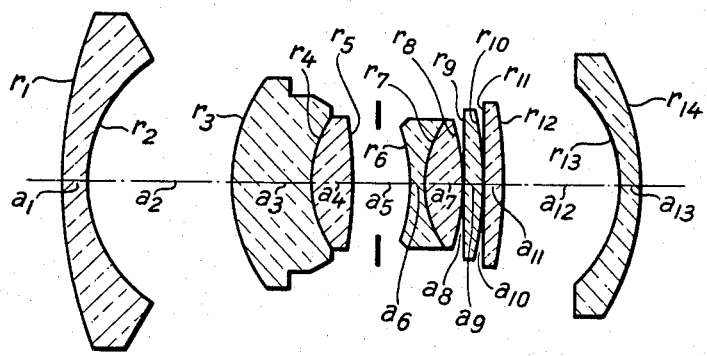
Figure 3:
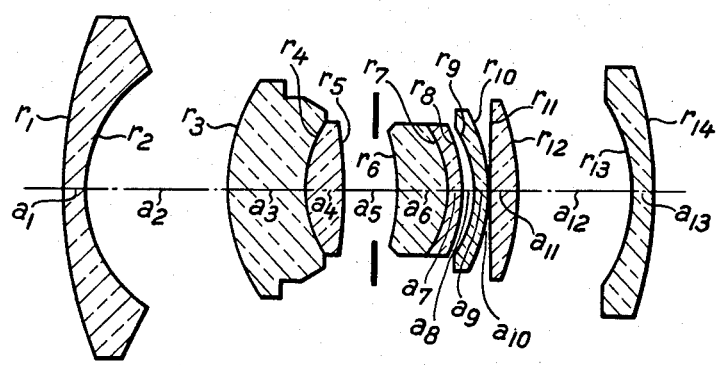
Figure 4:
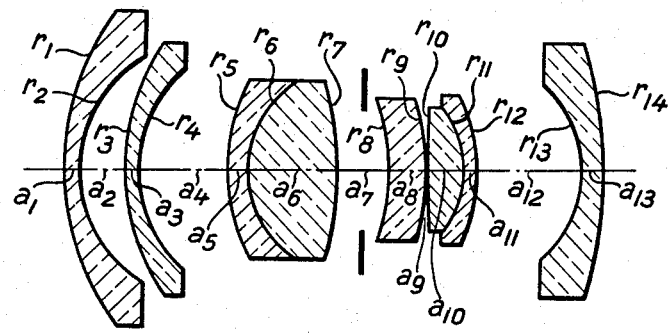

The above and other objects, advantages and features of the present invention will be more fully understood when considered in the light of the following detailed description of four specific embodiments thereof, taken in conjunction with the accompanying drawing, wherein
FIG. 1 is a side view of one embodiment of a wide-angle lens according to the present invention;
FIG. 2 is a similar side view of another embodiment.
FIG. 3 is a similar side view of a third embodiment; and
FIG. 4 is a similar side view of a fourth embodiment.

The parameters in the four figures are given in the following Tables 1 to 4, each table referring to the correspondingly numbered figure, wherein $r$ indicates the indicated radii of curvature of the lenses, and $a$ denotes the axial thickness or axial distances of, or between, the lenses.

In the tables $n_e$ is the refractive index related to the e-line and $v_e$ denotes the Abbé numbers.

Table 1

[Focal length $f=1.0$. Ratio of lens aperature $F=1:2.8$. Angle of image: 75°]

| Radii | Lens thickness or separations | $n_e$ | $v_e$ |
|---|---|---|---|
| $r_1 = +1.3412$ | | | |
| $r_2 = +0.7192$ | $a_1 = 0.0582$ | 1.50559 | 66.7 |
| $r_3 = +1.5744$ | $a_2 = 0.1247$ | | |
| $r_4 = +0.6888$ | $a_3 = 0.0582$ | 1.48915 | 69.9 |
| $r_5 = +0.7057$ | $a_4 = 0.4859$ | | |
| $r_6 = +0.4249$ | $a_5 = 0.2910$ | 1.79128 | 47.4 |
| $r_7 = -1.7427$ | $a_6 = 0.1455$ | 1.66104 | 57.1 |
| $r_8 = -0.5612$ | $a_7 = 0.0972$ | | |
| $r_9 = +0.4500$ | $a_8 = 0.0488$ | 1.75458 | 34.8 |
| $r_{10} = -0.9140$ | $a_9 = 0.1455$ | 1.74793 | 44.7 |
| $r_{11} = +8.5226$ | $a_{10} = 0.1071$ | | |
| $r_{12} = -1.4745$ | $a_{11} = 0.0728$ | 1.69290 | 49.4 |
| $r_{13} = -5.8307$ | $a_{12} = 0.0014$ | | |
| $r_{14} = -1.4645$ | $a_{13} = 0.0728$ | 1.69290 | 49.4 |
| $r_{15} = -0.4694$ | $a_{14} = 0.4365$ | | |
| $r_{16} = -0.8453$ | $a_{15} = 0.0780$ | 1.69416 | 30.9 |

Table 2

[Focal length $f=1.0$. Ratio of lens aperature $F=1:2.8$. Angle of image: 75°]

| Radii | Lens thickness or separations | $n_e$ | $v_e$ |
|---|---|---|---|
| $r_1 = +1.6688$ | | | |
| | $a_1 = 0.0793$ | 1.52928 | 50.9 |
| $r_2 = +0.5184$ | | | |
| | $a_2 = 0.5161$ | | |
| $r_3 = +0.6797$ | | | |
| | $a_3 = 0.2775$ | 1.79128 | 47.4 |
| $r_4 = +0.4243$ | | | |
| | $a_4 = 0.1386$ | 1.66104 | 57.1 |
| $r_5 = -1.7821$ | | | |
| | $a_5 = 0.1950$ | | |
| $r_6 = -0.5057$ | | | |
| | $a_6 = 0.0464$ | 1.75458 | 34.8 |
| $r_7 = +0.3791$ | | | |
| | $a_7 = 0.1386$ | 1.74793 | 44.7 |
| $r_8 = -0.8126$ | | | |
| | $a_8 = 0.0036$ | | |
| $r_9 = -35.3220$ | | | |
| | $a_9 = 0.0693$ | 1.69290 | 49.4 |
| $r_{10} = -1.1597$ | | | |
| | $a_{10} = 0.0036$ | | |
| $r_{11} = -17.5310$ | | | |
| | $a_{11} = 0.0693$ | 1.69290 | 49.4 |
| $r_{12} = -1.8072$ | | | |
| | $a_{12} = 0.4161$ | | |
| $r_{13} = -0.4567$ | | | |
| | $a_{13} = 0.0743$ | 1.69290 | 49.4 |
| $r_{14} = -0.8755$ | | | |

Table 3

[Focal length $f=1.0$. Ratio of lens aperture $F=1:2.8$. Angle of image: 75°]

| Radii | Lens thickness or separations | $n_e$ | $v_e$ |
|---|---|---|---|
| $r_1 = +1.7450$ | | | |
| | $a_1 = 0.0867$ | 1.52928 | 50.9 |
| $r_2 = +0.5443$ | | | |
| | $a_2 = 0.5645$ | | |
| $r_3 = +0.7531$ | | | |
| | $a_3 = 0.3035$ | 1.79128 | 47.0 |
| $r_4 = +0.4707$ | | | |
| | $a_4 = 0.1516$ | 1.66104 | 57.1 |
| $r_5 = -1.7405$ | | | |
| | $a_5 = 0.2133$ | | |
| $r_6 = -0.7962$ | | | |
| | $a_6 = 0.2000$ | 1.75833 | 53.1 |
| $r_7 = -0.4394$ | | | |
| | $a_7 = 0.0550$ | 1.92771 | 21.2 |
| $r_8 = -0.6037$ | | | |
| | $a_8 = 0.0500$ | | |
| $r_9 = -0.4427$ | | | |
| | $a_9 = 0.0550$ | 1.80166 | 28.2 |
| $r_{10} = -0.6687$ | | | |
| | $a_{10} = 0.0020$ | | |
| $r_{11} = -10.9830$ | | | |
| | $a_{11} = 0.1094$ | 1.79128 | 47.0 |
| $r_{12} = -0.9556$ | | | |
| | $a_{12} = 0.4551$ | | |
| $r_{13} = -0.6262$ | | | |
| | $a_{13} = 0.0809$ | 1.69290 | 49.4 |
| $r_{14} = -1.5660$ | | | |

Table 4

[Focal length $f=1.0$. Ratio of lens aperture $F=1:2.8$. Angle of image: 90°]

| Radii | Lens thickness or separations | $n_e$ | $v_e$ |
|---|---|---|---|
| $r_1 = +1.024083$ | | | |
| | $a_1 = 0.056881$ | 1.51871 | 64.0 |
| $r_2 = +0.513349$ | | | |
| | $a_2 = 0.181193$ | | |
| $r_3 = +0.874908$ | | | |
| | $a_3 = 0.056422$ | 1.51871 | 64.0 |
| $r_4 = +0.523899$ | | | |
| | $a_4 = 0.348165$ | | |
| $r_5 = +0.738716$ | | | |
| | $a_5 = 0.080734$ | 1.79128 | 47.2 |
| $r_6 = +0.413578$ | | | |
| | $a_6 = 0.351835$ | 1.62303 | 60.1 |
| $r_7 = -1.312523$ | | | |
| | $a_7 = 0.202752$ | | |
| $r_8 = -0.825459$ | | | |
| | $a_8 = 0.152294$ | 1.79128 | 47.2 |
| $r_9 = -0.981422$ | | | |
| | $a_9 = 0.001835$ | | |
| $r_{10} = +4.178945$ | | | |
| | $a_{10} = 0.139450$ | 1.62541 | 56.6 |
| $r_{11} = -0.389908$ | | | |
| | $a_{11} = 0.049541$ | 1.80166 | 28.2 |
| $r_{12} = -0.684312$ | | | |
| | $a_{12} = 0.417431$ | | |
| $r_{13} = -0.460367$ | | | |
| | $a_{13} = 0.079358$ | 1.62303 | 60.1 |
| $r_{14} = -1.740872$ | | | |

What we claim is:

1. A wide-angle lens for transmitting the image of an object through an aperture to an image-receiving plane, comprising a first meniscus lens means having at least one meniscus lens of negative refractive power and concave in the direction of the aperture, said first meniscus lens means being arranged between the object and the aperture; a first positive lens means between the said meniscus lens means and the aperture, said positive lens means having an axial thickness between 35% and 50% of the focal length of the wide-angle lens; a lens arrangement between the aperture and the image-receiving plane, the first positive lens means and the lens arrangement defining an aperture air space larger than 9% of said focal length, said lens arrangement consisting of a negative lens means adjacent the aperture and constituting a meniscus having a concave surface facing the aperture, the radius of curvature of the concave surface being smaller than the focal length of the wide-angle lens, the axial thickness of the negative lens means being between 10% and 30% of said focal length, and a separate lens group having at least one positive lens between the negative lens means and the image-receiving plane; and a second meniscus lens means having at least one meniscus lens with a concave surface of negative refractive power in the direction of the aperture, said second meniscus lens means being arranged between said lens arrangement and the image-receiving plane, the axial distances between the first meniscus lens means and the first positive lens means, on the one hand, and between the lens arrangement and the second meniscus lens means, on the other hand, being between 30% and 70% of said focal length.

2. The wide-angle lens of claim 1, wherein said negative lens means meniscus comprises a cemented interface.

3. The wide-angle lens of claim 1, wherein the negative lens means meniscus is composed of a positive meniscus having a concave surface facing the aperture and a separate negative meniscus.

4. The wide-angle lens of claim 1, wherein the negative lens means meniscus has a convex cemented surface facing the aperture.

5. The wide-angle lens of claim 4, wherein the equivalent Abbé number of the negative lens means is smaller than 25.

6. The wide-angle lens of claim 1, wherein the lens group of said lens arrangement consists of two air-separated positive lenses.

7. A wide-angle lens for transmitting the image of an object through an aperture to an image-receiving plane and having a focal length of 1.0, a relative aperture of 1:2.8 and an angle of image of 75°, comprising a first meniscus lens means having two meniscus lenses of negative refractive power and concave in the direction of the aperture between the object and the aperture; a first positive lens means between the said meniscus lens means and the aperture, said positive lens means consisting of two cemented lenses; a lens arrangement between the aperture and the image-receiving plane, said lens arrangement consisting of a negative lens with a concave surface facing the aperture said negative lens consisting of two cemented lenses, the radius of curvature of the concave surface being smaller than the focal length, a lens group consisting of two positive lenses between the negative lens and the image-receiving plane; and a second meniscus lens with a concave surface of negative refractive power in the direction of the aperture, the successive radii $r$ of succeeding surfaces of curvature of the above-named lenses and the successive axial distance $a$ between said surfaces of curvature being as follows:

[Focal length $f=1.0$. Ratio of lens aperture F=1:2.8. Angle of image: 75°]

| Radii | Lens thickness or separations | $n_e$ | $v_e$ |
|---|---|---|---|
| $r_1 = +1.3412$ | | | |
| | $a_1 = 0.0582$ | 1.50559 | 66.7 |
| $r_2 = +0.7192$ | | | |
| | $a_2 = 0.1247$ | | |
| $r_3 = +1.5744$ | | | |
| | $a_3 = 0.0582$ | 1.48915 | 69.9 |
| $r_4 = +0.6888$ | | | |
| | $a_4 = 0.4859$ | | |
| $r_5 = +0.7057$ | | | |
| | $a_5 = 0.2910$ | 1.79128 | 47.4 |
| $r_6 = +0.4249$ | | | |
| | $a_6 = 0.1455$ | 1.66104 | 57.1 |
| $r_7 = -1.7427$ | | | |
| | $a_7 = 0.0972$ | | |
| $r_8 = -0.5612$ | | | |
| | $a_8 = 0.0488$ | 1.75458 | 34.8 |
| $r_9 = +0.4500$ | | | |
| | $a_9 = 0.1455$ | 1.74793 | 44.7 |
| $r_{10} = -0.9140$ | | | |
| | $a_{10} = 0.1071$ | | |
| $r_{11} = +8.5226$ | | | |
| | $a_{11} = 0.0728$ | 1.69290 | 49.4 |
| $r_{12} = -1.4745$ | | | |
| | $a_{12} = 0.0014$ | | |
| $r_{13} = -5.8307$ | | | |
| | $a_{13} = 0.0728$ | 1.69290 | 49.4 |
| $r_{14} = -1.4645$ | | | |
| | $a_{14} = 0.4365$ | | |
| $r_{15} = -0.4694$ | | | |
| | $a_{15} = 0.0780$ | 1.69416 | 30.9 |
| $r_{16} = -0.8453$ | | | | wherein $n_e$ is the refractive index related to the $e$-line and $v_e$ is the Abbé number.

8. A wide-angle lens for transmitting the image of an object through an aperture to an image-receiving plane and having a focal length of 1.0, a relative aperture of 1:2.8 and an angle of image of 75°, comprising a first meniscus lens of negative refractive power and concave in the direction of the aperture between the object and the aperture; a first positive lens means between the said meniscus lens means and the aperture, said positive lens means consisting of two cemented lenses; a lens arrangement between the aperture and the image-receiving plane, said lens arrangement consisting of a negative meniscus having a concave surface facing the aperture, the said negative meniscus consisting of two cemented lenses, the radius of curvature of the concave surface being smaller than the focal length, and a lens group consisting of two positive lenses between the negative lens and the image-receiving plane; and a second meniscus lens with a concave surface of negative refractive power in the direction of the aperture, the successive radii $r$ of succeeding surfaces of curvature of the above-named lenses and the successive axial distances $a$ between said surfaces of curvature being as follows:

[Focal length $f=1.0$. Ratio of lens aperture F=1:2.8. Angle of image: 75°]

| Radii | Lens thickness or separations | $n_e$ | $v_e$ |
|---|---|---|---|
| $r_1 = +1.6688$ | | | |
| | $a_1 = 0.0793$ | 1.52928 | 50.9 |
| $r_2 = +0.5184$ | | | |
| | $a_2 = 0.5161$ | | |
| $r_3 = +0.6797$ | | | |
| | $a_3 = 0.2775$ | 1.79128 | 47.4 |
| $r_4 = +0.4243$ | | | |
| | $a_4 = 0.1386$ | 1.66104 | 57.1 |
| $r_5 = -1.7821$ | | | |
| | $a_5 = 0.1950$ | | |
| $r_6 = -0.5057$ | | | |
| | $a_6 = 0.0464$ | 1.75458 | 34.8 |
| $r_7 = +0.3791$ | | | |
| | $a_7 = 0.1386$ | 1.74793 | 44.7 |
| $r_8 = -0.8126$ | | | |
| | $a_8 = 0.0036$ | | |
| $r_9 = -35.3220$ | | | |
| | $a_9 = 0.0693$ | 1.69290 | 49.4 |
| $r_{10} = -1.1597$ | | | |
| | $a_{10} = 0.0036$ | | |
| $r_{11} = -17.5310$ | | | |
| | $a_{11} = 0.0693$ | 1.69290 | 49.4 |
| $r_{12} = -1.8072$ | | | |
| | $a_{12} = 0.4161$ | | |
| $r_{13} = -0.4567$ | | | |
| | $a_{13} = 0.0743$ | 1.69290 | 49.4 |
| $r_{14} = -0.8755$ | | | | wherein $n_e$ is the refractive index related to the $e$-line and $v_e$ is the Abbé number.

9. A wide-angle lens for transmitting the image of an object through an aperture to an image-receiving plane and having a focal length of 1.0, a relative aperture of 1:2.8 and an angle of image of 75°, comprising a first meniscus lens of negative refractive power and concave in the direction of the aperture between the object and the aperture; a first positive lens means between the said meniscus lens means and the aperture, said positive lens means consisting of two cemented lenses; a lens arrangement between the aperture and the image-receiving plane, said lens arrangement consisting of a negative lens consisting of a positive meniscus and a negative meniscus having a concave surface facing the aperture and consisting of two cemented lenses, the radius of curvature of the concave surface being smaller than the focal length, and a positive lens between the negative lens and the image-receiving plane; and a second meniscus lens with a concave surface of negative refractive power in the direction of the aperture, the successive radii $r$ of succeeding surfaces of curvature of the above-named lenses and the successive axial distances $a$ between said surfaces of curvature being as follows:

[Focal length $f=1.0$. Ratio of lens aperture F=1:2.8. Angle of image: 75°]

| Radii | Lens thickness or separations | $n_e$ | $v_e$ |
|---|---|---|---|
| $r_1 = + 1.7450$ | | | |
| | $a_1 = 0.0867$ | 1.52928 | 50.9 |
| $r_2 = + 0.5443$ | | | |
| | $a_2 = 0.5645$ | | |
| $r_3 = + 0.7531$ | | | |
| | $a_3 = 0.3035$ | 1.79128 | 47.0 |
| $r_4 = + 0.4707$ | | | |
| | $a_4 = 0.1516$ | 1.66104 | 57.1 |
| $r_5 = - 1.7405$ | | | |
| | $a_5 = 0.2133$ | | |
| $r_6 = - 0.7962$ | | | |
| | $a_6 = 0.2000$ | 1.75833 | 53.1 |
| $r_7 = - 0.4394$ | | | |
| | $a_7 = 0.0550$ | 1.92771 | 21.2 |
| $r_8 = - 0.6037$ | | | |
| | $a_8 = 0.0500$ | | |
| $r_9 = - 0.4427$ | | | |
| | $a_9 = 0.0550$ | 1.80166 | 28.2 |
| $r_{10} = - 0.6687$ | | | |
| | $a_{10} = 0.0020$ | | |
| $r_{11} = -10.9830$ | | | |
| | $a_{11} = 0.1094$ | 1.79128 | 47.0 |
| $r_{12} = - 0.9556$ | | | |
| | $a_{12} = 0.4551$ | | |
| $r_{13} = - 0.6262$ | | | |
| | $a_{13} = 0.0809$ | 1.69290 | 49.4 |
| $r_{14} = - 1.5660$ | | | | wherein $n_e$ is the refractive index related to the $e$-line and $v_e$ is the Abbé number.

10. A wide-angle lens for transmitting the image of an object through an aperture to an image-receiving plane and having a focal length of 1.0, a relative aperture of 1:2.8 and an angle of image of 90°, comprising a first meniscus lens means having two meniscus lenses of negative refractive power and concave in the direction of the aperture between the object and the aperture; a first positive lens means between the said meniscus lens means and the aperture, said positive lens means consisting of two cemented lenses; a lens arrangement between the aperture and the image-receiving plane, said lens arrangement consisting of a negative lens with a concave surface facing the aperture, the radius of curvature of the concave surface being smaller than the focal length, and a positive lens consisting of two cemented lenses between the negative lens and the image-receiving plane; and a second meniscus lens with a concave surface of negative refractive power in the direction of the aperture, the successive radii $r$ of succeeding surfaces of curvature of the above-named lenses and the successive axial distances $a$ between said surfaces of curvature being as follows:

[Focal length $f = 1.0$. Ratio of lens aperture $F = 1:2.8$. Angle of image: 90°]

| Radii | Lens thickness or separations | $n_e$ | $v_e$ |
|---|---|---|---|
| $r_1 = +1.024083$ | | | |
| | $a_1 = 0.056881$ | 1.51871 | 64.0 |
| $r_2 = +0.513349$ | | | |
| | $a_2 = 0.181193$ | | |
| $r_3 = +0.874908$ | | | |
| | $a_3 = 0.056422$ | 1.51871 | 64.0 |
| $r_4 = +0.523899$ | | | |
| | $a_4 = 0.348165$ | | |
| $r_5 = +0.738716$ | | | |
| | $a_5 = 0.080734$ | 1.79128 | 47.2 |
| $r_6 = +0.413578$ | | | |
| | $a_6 = 0.351835$ | 1.62303 | 60.1 |
| $r_7 = -1.312523$ | | | |
| | $a_7 = 0.202752$ | | |
| $r_8 = -0.825459$ | | | |
| | $a_8 = 0.152294$ | 1.79128 | 47.2 |
| $r_9 = -0.981422$ | | | |
| | $a_9 = 0.001835$ | | |
| $r_{10} = +4.178945$ | | | |
| | $a_{10} = 0.139450$ | 1.62541 | 56.6 |
| $r_{11} = -0.389908$ | | | |
| | $a_{11} = 0.049541$ | 1.80166 | 28.2 |
| $r_{12} = -0.684312$ | | | |
| | $a_{12} = 0.417431$ | | |
| $r_{13} = -0.460367$ | | | |
| | $a_{13} = 0.079358$ | 1.62303 | 60.1 |
| $r_{14} = -1.740872$ | | | | wherein $n_e$ is the refractive index related to the $e$-line and $v_e$ is the Abbé number.

References Cited in the file of this patent

UNITED STATES PATENTS 2,721,499    Bertele ---------------- Oct. 25, 1955